(12) United States Patent
Reed et al.

(10) Patent No.: US 12,013,784 B2
(45) Date of Patent: Jun. 18, 2024

(54) PREFETCH STATE CACHE (PSC)

(71) Applicant: CENTAUR TECHNOLOGY, INC., AUSTIN, TX (US)

(72) Inventors: Douglas Raye Reed, Austin, TX (US); Akarsh Dolthatta Hebbar, Austin, TX (US)

(73) Assignee: CENTAUR TECHNOLOGY, INC., Austin, TX (US)

( * ) Notice: Subject to any disclaimer, the term of this patent is extended or adjusted under 35 U.S.C. 154(b) by 64 days.

(21) Appl. No.: 17/570,456

(22) Filed: Jan. 7, 2022

(65) Prior Publication Data

US 2023/0222065 A1 Jul. 13, 2023

(51) Int. Cl.
| | |
|---|---|
| *G06F 12/08* | (2016.01) |
| *G06F 9/30* | (2018.01) |
| *G06F 9/48* | (2006.01) |
| *G06F 12/02* | (2006.01) |
| *G06F 12/0862* | (2016.01) |
| *G06F 12/0891* | (2016.01) |

(52) U.S. Cl.
CPC ...... *G06F 12/0862* (2013.01); *G06F 9/30047* (2013.01); *G06F 9/4881* (2013.01); *G06F 12/0238* (2013.01); *G06F 12/0891* (2013.01)

(58) Field of Classification Search
CPC .. G06F 12/08; G06F 12/0862; G06F 12/0238; G06F 12/02; G06F 12/0891; G06F 9/4881; G06F 9/30047
See application file for complete search history.

(56) References Cited

U.S. PATENT DOCUMENTS

| | | | |
|---|---|---|---|
| 7,487,296 B1* | 2/2009 | Iacobovici | G06F 9/383 |
| | | | 712/207 |
| 8,880,807 B2 | 11/2014 | Hooker et al. | |
| 10,331,567 B1* | 6/2019 | Meier | G06F 12/0862 |
| 2007/0294482 A1* | 12/2007 | Kadambi | G06F 9/383 |
| | | | 711/137 |
| 2011/0238922 A1* | 9/2011 | Hooker | G06F 9/3814 |
| | | | 711/E12.004 |

(Continued)

FOREIGN PATENT DOCUMENTS

| | | | | |
|---|---|---|---|---|
| WO | WO-2011107882 A2 * | 9/2011 | | G06F 12/0862 |
| WO | WO-2017222792 A1 * | 12/2017 | | G06F 12/0811 |
| WO | WO-2018057273 A1 * | 3/2018 | | G06F 12/0862 |

OTHER PUBLICATIONS

M. Ferdman, T. F. Wenisch, A. Ailamaki, B. Falsafi and A. Moshovos, "Temporal instruction fetch streaming," 2008 41st IEEE/ACM International Symposium on Microarchitecture, Como, Italy, 2008, pp. 1-10.*

(Continued)

*Primary Examiner* — Pierre Michel Bataille
(74) *Attorney, Agent, or Firm* — McClure, Qualey & Rodack, LLP

(57) ABSTRACT

In one embodiment, a bounding box prefetch unit in a microprocessor, the bounding box prefetch unit comprising: storage comprising a plurality of active prefetcher state entries for storing state information for a corresponding plurality of access streams associated with load requests, and a corresponding plurality of prediction logic; and a prefetcher state cache comprising plural prefetcher state entries that do not match any of the active prefetcher state entries.

20 Claims, 8 Drawing Sheets

(56) References Cited

U.S. PATENT DOCUMENTS

2015/0026414 A1* 1/2015 Kalamatianos ......... G06F 12/06
711/137
2020/0301840 A1 9/2020 Reed et al.

OTHER PUBLICATIONS

S. Pakalapati and B. Panda, "Bouquet of Instruction Pointers: Instruction Pointer Classifier-based Spatial Hardware Prefetching," 2020 ACM/IEEE 47th Annual International Symposium on Computer Architecture (ISCA), Valencia, Spain, 2020, pp. 118-131.*

* cited by examiner

PREFETCH STATE CACHE (PSC)

TECHNICAL FIELD

The present invention relates in general to microprocessors, and in particular, prefetching in microprocessors.

BACKGROUND

Most modern computer systems include a microprocessor that performs the computations necessary to execute software programs. Computer systems also include other devices connected to (or internal to) the microprocessor, such as memory. The memory stores the software program instructions to be executed by the microprocessor. The memory also stores data that the program instructions manipulate to achieve the desired function of the program.

The devices in the computer system that are external to the microprocessor (or external to a processor core), such as the memory, are directly or indirectly connected to the microprocessor (or core) by a processor bus. The processor bus comprises a collection of signals that enable the microprocessor to transfer data in relatively large chunks. When the microprocessor executes program instructions that perform computations on the data stored in the memory, the microprocessor fetches the data from memory into the microprocessor using the processor bus. Similarly, the microprocessor writes results of the computations back to the memory using the processor bus.

The time required to fetch data from memory or to write data to memory is many times greater than the time required by the microprocessor to perform the computation on the data. Consequently, the microprocessor inefficiently waits idle for the data to be fetched from memory. To reduce this problem, modern microprocessors include at least one cache memory. The cache memory, or cache, is a memory internal to the microprocessor (or processor core)—typically much smaller than the system memory—that stores a subset of the data in the system memory. When the microprocessor executes an instruction that references data, the microprocessor checks to see if the data is present in the cache and is valid. If so, the instruction can be executed more quickly than if the data had to be retrieved from system memory since the data is already present in the cache. That is, the microprocessor does not have to wait while the data is fetched from the memory into the cache using the processor bus. The condition where the microprocessor detects that the data is present in the cache and valid is commonly referred to as a cache hit. The condition where the referenced data is not present in the cache is commonly referred to as a cache miss. When the referenced data is already in the cache memory, significant time savings are realized, by avoiding the extra clock cycles required to retrieve data from external memory.

Cache prefetching via a prefetch unit (also referred to as a prefetcher) is a technique used by microprocessors to further boost execution performance by fetching instructions or data from external memory into a cache memory, before the data or instructions are actually needed by the processor. Successfully prefetching data avoids the latency that is encountered when having to retrieve data from external memory.

There is a basic tradeoff in prefetching. As noted above, prefetching can improve performance by reducing latency (by already fetching the data into the cache memory, before it is actually needed). On the other hand, if too much information (e.g., too many cache lines) is prefetched, then the efficiency of the prefetch unit is reduced, and other system resources and bandwidth may be overtaxed. Furthermore, if a cache is full, then prefetching a new cache line into that cache will result in eviction from the cache of another cache line. Thus, a line in the cache that was in the cache because it was previously needed might be evicted by a line that only might be needed in the future.

In some microprocessors, the cache is actually made up of multiple caches. The multiple caches are arranged in a hierarchy of multiple levels. For example, a microprocessor may have two caches, referred to as a first-level (L1) cache and a second-level (L2) cache. The L1 cache is closer to the computation elements of the microprocessor than the L2 cache. That is, the L1 cache is capable of providing data to the computation elements faster than the L2 cache. The L2 cache is commonly larger and has more storage resources than the L1 cache. Some microprocessors may have a third cache (L3), which may be larger than the L2 cache.

Fetch times increase as fetches go from L1, L2, L3 caches, and system memory based on a cache miss (e.g., 10-20 clock cycles from L2, 20-30 clock cycles from L3 for illustration), and so it is desirable from a latency standpoint to not only intelligently store data in the appropriate cache, but to intelligently prefetch data.

SUMMARY

In one embodiment, a bounding box prefetch unit in a microprocessor, the bounding box prefetch unit comprising: storage comprising a plurality of active prefetcher state entries for storing state information for a corresponding plurality of access streams associated with load requests, and a corresponding plurality of prediction logic; and a prefetcher state cache comprising plural prefetcher state entries that do not match any of the active prefetcher state entries.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Various aspects of the invention can be better understood with reference to the following drawings. The components in the drawings are not necessarily to scale, with emphasis instead being placed upon clearly illustrating the principles of the present invention. Moreover, in the drawings, like reference numerals designate corresponding parts throughout the several views.

DETAILED DESCRIPTION

Figure 1:
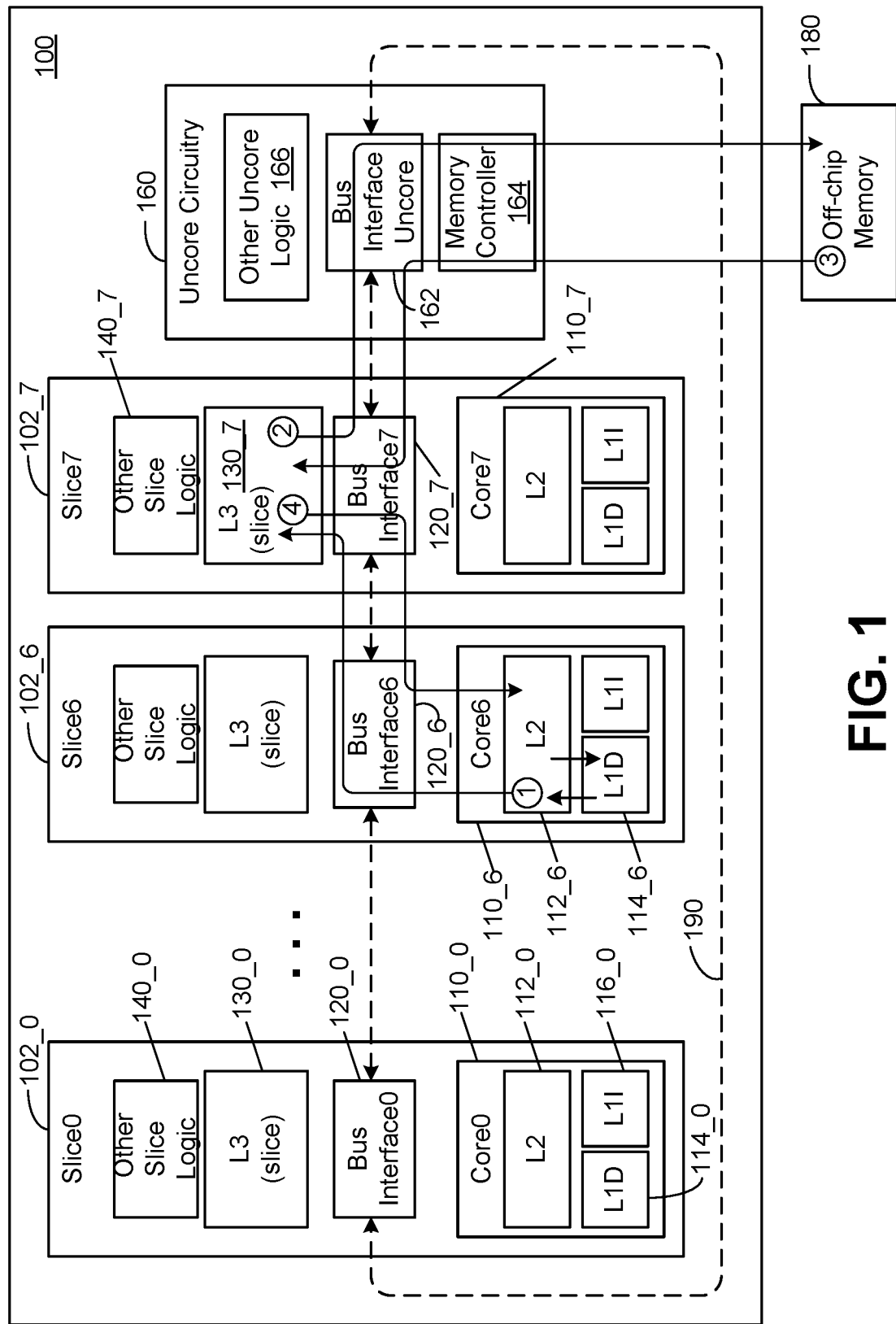
FIG. 1 is a block diagram showing an example microprocessor in which an embodiment of a bounding box prefetch unit with prefetcher state cache (PSC) is implemented.

Certain embodiments of a bounding box prefetch unit with prefetcher state cache (PSC) of a microprocessor, and associated methods, are disclosed that increase the capacity to store and hence track state information for access streams comprising load requests that are received by the bounding box prefetch unit, decoupled from any concomitant increase in prediction logic. In one embodiment, the bounding box prefetch unit comprises storage with a plurality of prefetcher state entries each for actively tracking an access stream associated with load requests for a respective page or memory region, such as a 4 kilobyte (KB) memory region. Such prefetcher state entries are also referred to herein as active prefetcher state entries. Prefetcher state entries may also be referred to as stream entries (e.g., state information for respective access streams). The bounding box prefetch unit further comprises additional storage in the way of the prefetcher state cache. The prefetcher state cache comprises a plurality of prefetcher state entries (as distinguished from active prefetcher state entries) for storing state information for access streams when a load comes into the bounding box prefetch unit with PSC that does not match any active prefetcher state entries and all of the active prefetcher state entries are utilized. The prefetcher state cache has no corresponding prediction logic, and is used at least in part to retain state information for evicted active prefetcher state entries (e.g., due to staleness or insufficient confidence) and for access streams where confidence has not yet been established to qualify as an active prefetcher state entry.

Digressing briefly, the bounding box prefetch unit comprises storage having a plurality of prefetcher state entries (e.g., for storing state information) and a corresponding plurality of control logic (e.g., prediction logic) for tracking access streams for a corresponding plurality of pages, each page associated with a respective memory region, and generating prefetches. For instance, each of the prefetcher state entries and corresponding logic is used for pattern matching and prefetch generation for each corresponding page (e.g., one 4 kilobyte (KB) page of physical memory). As described further below, in general, the bounding box prefetch unit receives first-level cache data and instruction (e.g., L1d and L1i) load requests as part of an access stream coming into the second-level 2 cache, each load request decoded into a 4 KB-aligned page address region to enable a determination by the bounding box prefetch unit as to whether prefetcher state entries in the plurality of storage are already tracking the incoming access stream. If one of the prefetcher state entries is already tracking this access stream (i.e., an active prefetcher state entry), then the load request updates the state information in that matching prefetcher state entry and the corresponding prediction logic may decide to generate some prefetches as a result, where the corresponding prefetch requests go out through an arbiter into a queue and then into a tag pipeline as described further below.

One issue with conventional prefetchers centers around the fact that the number of different access streams to track is directly proportional to the number of active prefetcher state entries in the plurality of storage maintained by the bounding box prefetch unit, since state information including a direction or trend of stream accesses, which cache lines have already been requested, which cache lines have been demand requested, which cache lines have already been prefetched, patterns, max and min pointers, among other state information, is used to generate prefetches. If the plurality of storage only contains, say, four prefetcher state entries, that means that the bounding box prefetch unit is limited to tracking four access streams (each of, say, a 4 KB page) at a time for which prefetches may be generated. Beyond four access streams, say five access streams, at best, the bounding box prefetch unit is not generating $\frac{1}{5}^{th}$ of the prefetches (since $\frac{1}{5}^{th}$ of the stream accesses will not match with an active prefetcher state entry corresponding to this page). A worst case scenario arises where the bounding box prefetch unit attempts to establish confidence for the, say, four access streams, and then with the introduction of a fifth access stream, one of the prefetcher state entries is evicted in favor of the fifth access stream, requiring a build-up of confidence and state information before an introduction of yet another stream that requires eviction, or that requires re-introducing an evicted prefetcher state entry and again, the needed build-up of state information and confidence. In some cases, the new access stream may exhibit no locality with respect to the other active access streams, and in fact, a prefetcher state entry may have been evicted that provided the basis for prefetches of increased confidence. In effect, one possible result of this turnover is the absence of generation of any prefetches or prefetches of satisfactory confidence.

A similar issue is seen at the software level, where the software for which the logic is attempting to optimize has more active streams than it has prefetcher state entries. For instance, if a processor is running four applications, and the operating system is scheduling in round-robin fashion between the four applications, switching among applications may result in a difference in the quality and/or quantity of prefetches. The switching results in eviction of state information, and hence the need to build up state information and confidence once again for evicted entries.

One mechanism to address the capacity issue (and track as many access streams as possible) is to increase the amount of prefetcher state entries. However, in the past, this increased storage capacity had a concomitant increase in the complexity and number of prediction logic associated with each prefetcher state entry. In other words, growth to improve the capacity for tracking access streams involves a two-dimensional growth in terms of the number of prefetcher state entries and the corresponding prediction logic. In contrast, certain embodiments of a bounding box prefetch unit with prefetcher state cache provides for an increased quantity of prefetcher state entries to track more access streams, without adding prediction logic.

Having summarized certain features of a bounding box prefetch unit with PSC of the present invention, reference will now be made in detail to the description of a bounding box prefetch unit with PSC as illustrated in the drawings. While a bounding box prefetch unit with PSC will be described in connection with these drawings, there is no intent to limit it to the embodiment or embodiments disclosed herein. That is, while the invention is susceptible to various modifications and alternative forms, specific embodiments thereof are shown by way of example in the drawings and will herein be described in detail sufficient for an understanding of persons skilled in the art. It should be understood, however, that the drawings and detailed description thereto are not intended to limit the invention to the particular form disclosed. On the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include", "including", and "includes" (and similarly with "comprise", "comprising", and "comprises") mean including (comprising), but not limited to.

Various units, modules, circuits, logic, or other components may be described as "configured to" perform a task or tasks. In such contexts, "configured to" is a broad recitation of structure generally meaning "having circuitry or another physical structure that" performs, or is capable of performing, the task or tasks during operations. The circuitry may be dedicated circuitry, or more general processing circuitry operating under the control of coded instructions. That is, terms like "unit", "module", "circuit", "logic", and "component" may be used herein, in describing certain aspects or features of various implementations of the invention. It will be understood by persons skilled in the art that the corresponding features are implemented utilizing circuitry, whether it be dedicated circuitry or more general purpose circuitry operating under micro-coded instruction control.

Further, the unit/module/circuit/logic/component can be configured to perform the task even when the unit/module/circuit/logic/component is not currently in operation. Reciting a unit/module/circuit/logic/component that is configured to perform one or more tasks is expressly intended not to invoke 35 U.S.C. § 112(f) for that unit/module/circuit/logic/component. In this regard, persons of ordinary skill in the art will appreciate that the specific structure or interconnections of the circuit elements will typically be determined by a compiler of a design automation tool, such as a register transfer language (RTL) compiler. RTL compilers operate upon scripts that closely resemble assembly language code, to compile the script into a form that is used for the layout or fabrication of the ultimate circuitry.

That is, integrated circuits (such as those of the present invention) are designed using higher-level software tools to model the desired functional operation of a circuit. As is well known, "Electronic Design Automation" (or EDA) is a category of software tools for designing electronic systems, such as integrated circuits. EDA tools are also used for programming design functionality into field-programmable gate arrays (FPGAs). Hardware descriptor languages (HDLs), like Verilog and very high-speed integrated circuit (e.g., VHDL) are used to create high-level representations of a circuit, from which lower-level representations and ultimately actual wiring can be derived. Indeed, since a modern semiconductor chip can have billions of components, EDA tools are recognized as essential for their design. In practice, a circuit designer specifies operational functions using a programming language like C/C++. An EDA software tool converts that specified functionality into RTL. Then, a hardware descriptor language (e.g. Verilog) converts the RTL into a discrete netlist of gates. This netlist defines the actual circuit that is produced by, for example, a foundry. Indeed, these tools are well known and understood for their role and use in the facilitation of the design process of electronic and digital systems, and therefore need not be described herein.

FIG. 1 is a block diagram showing an example microprocessor in which an embodiment of a bounding box prefetch unit with PSC is implemented. As will be described herein, the present invention is directed to an improved mechanism for enabling the tracking of more access streams via the increased storage of state information without added prediction logic. One example architecture is described below, in which the inventive bounding box prefetch unit with PSC may be utilized. In this regard, reference is now made to FIG. 1, which is a diagram illustrating a multi-core microprocessor 100. As will be appreciated by persons having ordinary skill in the art from the description provided herein, the present invention may be implemented in a variety of circuit configurations and architectures, and the architecture illustrated in FIG. 1 is merely one of many suitable architectures. Specifically, in the embodiment illustrated in FIG. 1, the microprocessor 100 is an eight-core processor, wherein the cores are enumerated core0 110_0 through core7 110_7. In the illustrated embodiment, numerous circuit components and details are omitted, which are not germane to an understanding of the present invention. As will be appreciated by persons having ordinary skill in the art, each processing core (110_0 through 110_7) includes certain associated or companion circuitry that is replicated throughout the microprocessor 100. Each such related sub-circuit is denoted in the illustrated embodiment as a slice. With eight processing cores 110_0 through 110_7, there are correspondingly eight slices 102_0 through 102_7. Other circuitry that is not described herein is merely denoted as "other slice logic" 140_0 through 140_7.

In the illustrated embodiment, a three-level cache system is employed, which includes a level-one (L1) cache, a level-two (L2) cache, and a level-three (L3) cache. The L1 cache is separated into both a data cache and an instruction cache, respectively denoted as L1D and L1I. The L2 cache also resides on core, meaning that both the L1 cache and the L2 cache are in the same circuitry as the core of each slice. That is, each core of each slice has its own dedicated L1D, L1I, and L2 caches. Outside of the core, but within each slice is an L3 cache. In one embodiment, the L3 cache 130_0 through 130_7 (also collectively referred to herein as 130) is a distributed cache, meaning that ⅛th of the L3 cache resides in slice0 102_0, ⅛th of the L3 cache resides in slice1 102_1, etc. In one embodiment, each L1 cache is 32 k in size, each L2 cache is 256 k in size, and each slice of the L3 cache is 2 megabytes in size. Thus, the total size of the L3 cache is 16 megabytes. Note that other individual or aggregate cache sizes may be used in some embodiments.

Bus interface logic 120_0 through 120_7 is provided in each slice to manage communications from the various circuit components among the different slices. As illustrated in FIG. 1, a communication bus is 190 is utilized to allow communications among the various circuit slices, as well as with uncore circuitry 160. The uncore circuitry 160 merely denotes additional circuitry that is on the processor chip, but is not part of the core circuitry associated with each slice. As with each illustrated slice, the un-core circuitry 160 includes a bus interface circuit 162. Also illustrated is a memory controller 164 for interfacing with off-processor (off-chip)

memory 180. Finally, other un-core logic 166 is broadly denoted by a block, which represents other circuitry that may be included as a part of the un-core processor circuitry (and again, which need not be described for an understanding of the invention).

To better illustrate certain inter and intra communications of some of the circuit components, the following example will be presented. This example illustrates communications associated with a hypothetical load miss in core6 cache. That is, this hypothetical assumes that the processing core6 110_6 is executing code that requests a load for data at hypothetical address 1000. When such a load request is encountered, the system first performs a lookup in L1D 114_6 to see if that data exists in the L1D cache. Assuming that the data is not in the L1D cache, then a lookup is performed in the L2 cache 112_6. Again, assuming that the data is not in the L2 cache, then a lookup is performed to see if the data exists in the L3 cache. As mentioned above, the L3 cache is a distributed cache, so the system first needs to determine which slice of the L3 cache the data should reside in, if in fact it resides in the L3 cache. As is known, this process can be performed using a hashing function, which is merely the exclusive ORing of bits, to get a three-bit address (sufficient to identify which slice—slice 0 through slice 7—the data is stored in).

In keeping with the example, assume this hashing function results in an indication that the data, if present in the L3 cache, would be present in that portion of the L3 cache residing in slice7. A communication is then made from the L2 cache of slice6 102_6 through bus interfaces 120_6 and 120_7 to the L3 cache present in slice7 102_7. This communication is denoted in the figure by the encircled number 1. If the data was present in the L3 cache, then it would be communicated back from the L3 cache 130_7 to the L2 cache 112_6. However, and in this example, assume that the data is not in the L3 cache either, resulting in a cache miss. Consequently, a communication is made from the L3 cache 130_7 through bus interface7 120_7 through the un-core bus interface 162 to the off-chip memory 180, through the memory controller 164. This communication is denoted in the figure by the encircled number 2. A cache line that includes the data residing at address 1000 is then communicated from the off-chip memory 180 back through memory controller 164 and un-core bus interface 162 into the L3 cache 130_7. This communication is denoted in the figure by the encircled number 3. After that data is written into the L3 cache, it is then communicated to the requesting core, core6 110_6 through the bus interfaces 120_7 and 120_6. This communication is denoted in the figure by the encircled number 4.

At this point, once the load request has been completed, that data will reside in each of the caches L3, L2, and L1D. The present invention is directed to an improved bounding box prefetch unit that resides in each of the L2 caches 112_0 through 112_7. In the illustrated embodiment, as mentioned above, the L1 cache is a relatively small sized cache. Consequently, there can be performance and bandwidth consequences for prefetching too aggressively into the L1 cache. In this regard, a more complex or aggressive prefetcher generally consumes more silicon real estate in the chip, as well as more power and other resources. Also, from the example described above, excessive prefetching into the L1 cache would often result in more misses and evictions. This would consume additional circuit resources, as well as bandwidth resources for the communications necessary for prefetching the data into the respective L1 cache. More specifically, since the illustrated embodiment shares an on-chip communication bus denoted by the dashed line 190, excessive communications would consume additional bandwidth, potentially unnecessarily delaying other communications or resources that are needed by other portions of the microprocessor 100.

In one embodiment, the L1I and L1D caches are both smaller than the L2 cache and need to be able to satisfy data requests much faster. Therefore, the prefetcher that is implemented in the L1I and L1D caches of each slice is preferably a relatively simple prefetcher. As well, the L1D cache needs to be able to pipeline requests. Therefore, putting additional prefetching circuitry in the L1D can be relatively taxing. Further still, a complicated prefetcher would likely get in the way of other necessary circuitry. With regard to a cache line of each of the L1 caches, in one embodiment the cache line is 64 bytes. Thus, 64 bytes of load data can be loaded per clock cycle.

As mentioned above, in one embodiment, the L2 cache is preferably 256 KB in size. Having a larger area than prefetch units implemented in the L1 cache, the bounding box prefetch unit implemented in the L2 cache can be more complex and aggressive. Generally, implementing a more complicated prefetcher in the L2 cache results in less of a performance penalty (e.g., as compared to an L1 prefetcher) for bringing in data speculatively. Therefore, the bounding box prefetch unit with PSC of the present invention is implemented in the L2 cache.

Figure 2:
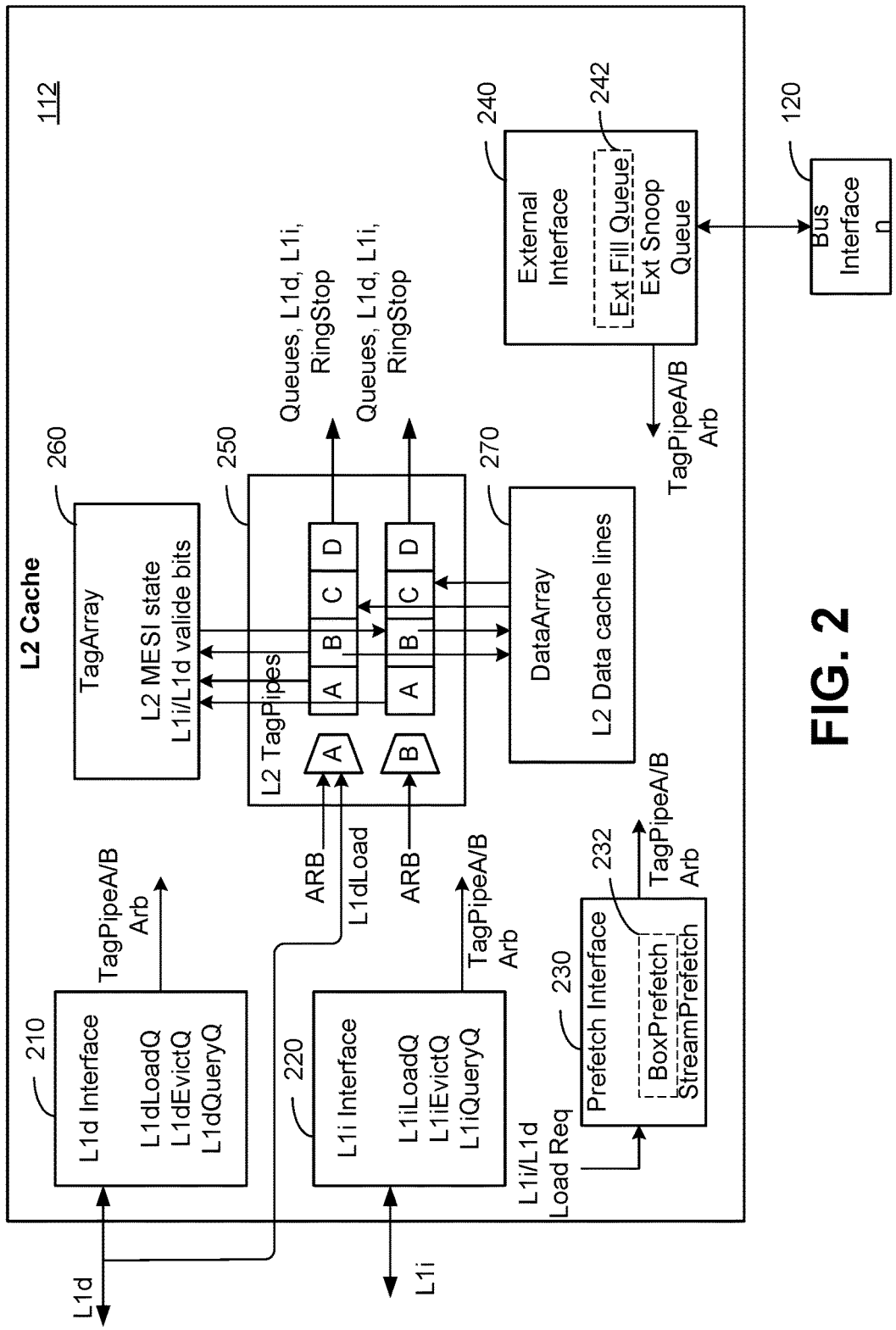
FIG. 2 is a block diagram showing an example L2 cache in which an embodiment of a bounding box prefetch unit with PSC is implemented.

Before describing details of the inventive bounding box prefetch unit with PSC, reference is first made to FIG. 2, which is a block diagram showing an example L2 cache 112 in which an embodiment of a bounding box prefetch unit with PSC 232 is implemented. Specifically, the components illustrated in FIG. 2 depict the bounding box prefetch unit with PSC 232 and other basic features of a structure that facilitate the communications within the L2 cache 112 and with other components in the system illustrated in FIG. 1. As shown, there are four main boxes 210, 220, 230, and 240, which illustrate an L1D interface 210, an L1I interface 220, a prefetch interface 230, and an external interface 240. Collectively, these boxes denote circuitry that queue and track transactions or requests through the L2 cache 112. As illustrated in FIG. 1, in each core, there is both an L1D and L1I cache, and a higher level L2 cache. The L1D interface 210 and L1I interface 220 interface the L2 cache with the L1 caches. These interfaces implement a load queue, an evict queue and a query queue, for example, as mechanisms to facilitate this communication. The prefetch interface 230 is circuitry that facilitates communications associated with the bounding box prefetch unit with PSC 232 of the present invention, which will be described in more detail below. In one embodiment, the prefetch interface 230 implements both a bounding box prefetch unit with PSC 232 and a stream prefetcher, and may make prefetch determination based on results of their associated algorithms. As is known, the design of prefetchers often involves a tradeoff between how quickly the prefetcher can warm up (e.g., how much state is required to be built up before generating prefetches) and how aggressively the prefetcher makes requests. As an illustration, a bounding box prefetcher may take a relatively long time to warm up (e.g., 5-8 requests) before a pattern is established, yet once a pattern is established, there is relatively good confidence that the pattern is a good pattern upon which the prefetching is based, and thus prefetches may be performed relatively aggressively. On the other hand, stream prefetchers are much less sophisticated, whereby it may take only three accesses to warm up (e.g., build up state) before prefetches are generated. In effect, stream prefetchers essentially look for a repeated stride between sequential accesses, and generate prefetches according to that stride. Further, stream prefetchers may perform next-line prefetching in cases where a new request comes into a new page that is not currently being tracked. Collectively, such features enable stream prefetchers to begin prefetching very early on once commencing a new page, though the prefetches are of lower confidence and thus are issued less aggressively. There are numerous, known stream prefetching algorithms that may be used for the stream prefetch unit, the discussion of which is omitted here as unnecessary for describing the bounding box prefetch unit with PSC, which is the subject of the present disclosure. A general structure and operation of bounding box prefetchers is described in U.S. Pat. No. 8,880,807, which is incorporated herein by reference in its entirety, and for which a general description of select features of a bounding box prefetcher is described below.

As will be appreciated by those having ordinary skill in the art, the prefetching algorithms used by the bounding box prefetch unit with PSC 232 (and the stream prefetching unit) are performed in part by monitoring load requests from L1I and L1D caches associated with a given core. Accordingly, these are illustrated as inputs to the prefetch interface 230. The output of the prefetch interface 230 is in the form of an arbitration request, followed by entry into a queue and then provision of prefetch requests to a tagpipe 250, whose relevant function, which is briefly described herein, will be appreciated by persons having ordinary skill in the art. Finally, the external interface 240 provides the interface to components outside the L2 cache and indeed outside the processor core, and includes an L2 fill queue 242, as explained below, and an external snoop queue. As described in connection with FIG. 1, such communications, particularly off-slice communications, are routed through the bus interface 120.

As illustrated in FIG. 2, each of the circuit blocks 210, 220, 230, and 240, have outputs that are denoted as tagpipe arbitration (arb) requests. Tagpipes 250 are provided as a central point through which almost all L2 cache traffic travels. In the illustrated embodiment, there are two tagpipes denoted as A and B. Two such tagpipes are provided merely for load balancing, and as such the tagpipe requests that are output from circuits 210, 220, 230, and 240, the various interface circuits, can be directed to either tagpipe A or tagpipe B, again based on load balancing. In one embodiment, the tagpipes are four stage pipes, with the stages denoted by letters A, B, C, and D, though in some embodiments, other quantities of stages may be used. Transactions to access the cache, sometimes referred to herein as "tagpipe arbs," advance through the stages of the tagpipe 250. During the A stage, a transaction requests into the tagpipe. During the B stage, the tag is sent to the arrays (tag array 260 and data array 270). During the C stage, MESI information and an indication of whether the tag hit or miss in the LLC is received from the arrays and a determination is made on what action to take in view of the information received from the array. During the D stage, the action decision (complete/replay, allocate a fill queue entry, etc.) is staged back to the requesting queues.

The external interface 240 comprises the external fill queue 242 (or simply referred to herein also as fill queue or L2 fill queue), and an external snoop queue. Any time there is a miss in the L2 cache, an entry is allocated to the fill queue 242. The fill queue limits the total number of outstanding L2 to L3 misses. The fill queue 242 comprises a collection of state registers that track such information as physical addresses, a memory tree, certain features of the opcode (e.g., whether it is read, validate, a cache line flush, a regular load request, I/O request, whether it is destined for an accelerator, etc.). Also, the fill queue 242 includes control logic (e.g., a finite state machine per entry), which tracks such information as whether there is a cache line to evict, among other functions as should be appreciated by one having ordinary skill in the art.

Finally, FIG. 2 illustrates a tag array 260 and data array 270. The tag array 260 effectively or essentially includes metadata while the data array 270 is the memory space that includes the actual cache lines of data. The metadata in the tag array 260 includes MESI state as well as the L1I and L1D valid bits. As is known, the MESI state defines whether the data stored in the data array 270 are in one of the modified ("M"), exclusive ("E"), shared ("S"), or invalid ("I") states.

Figure 3A:
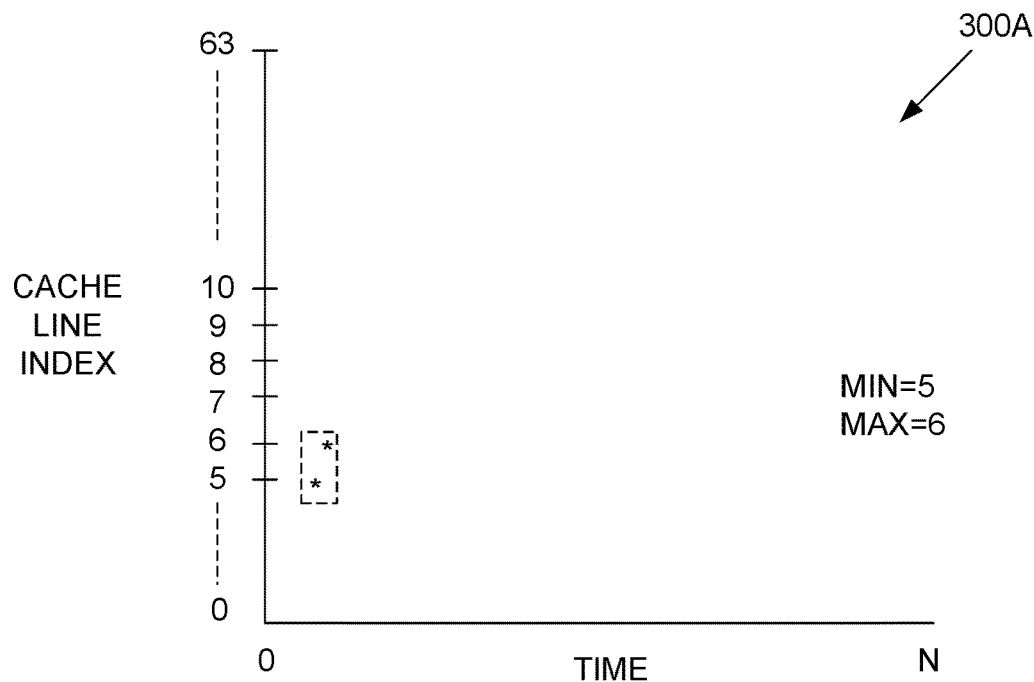
FIGS. 3A-3B are plot diagrams that illustrate bounding box prefetching.
Figure 3B:
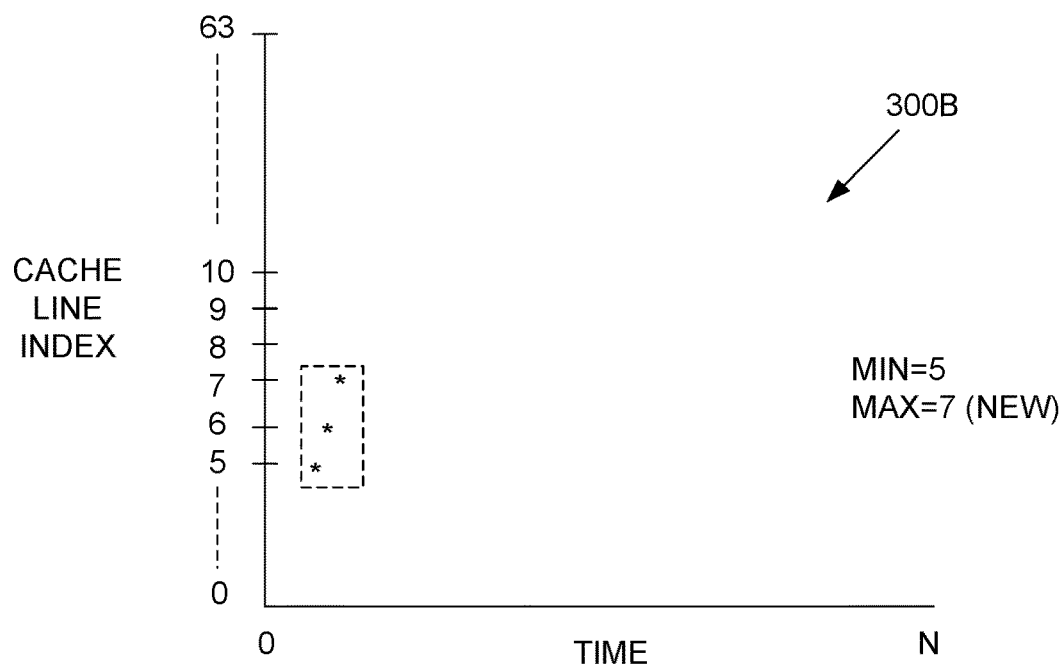

Having described an example environment in which certain embodiments of a bounding box prefetch unit with PSC may be implemented, attention is directed to FIGS. 3A-3B, which are plot diagrams that generally illustrate bounding box prefetching. Broadly speaking, bounding box prefetching may be explained as follows. If all accesses to a memory block were represented on a graph, the set of all accesses may be enclosed by a bounding box (e.g., schematically illustrated with a dashed box in FIGS. 3A-3B). If additional requests were represented on the same graph, those requests may also be enclosed by adjusting the size of the bounding box. In the first graph 300A shown in FIG. 3A, two accesses to a memory block are represented. The x-axis reflects a temporal order of the accesses. The y-axis represents a 64-byte cache line index within a 4 kilobyte (KB) block of the access. Initially, the first two accesses are graphed: the first is to cache line 5, the second is to cache line 6. A box is drawn which encloses these two points, and pointers indicating minimum (e.g., min=5) and maximum (e.g., max=6) access locations are shown on the right-hand side of the diagram 300A.

Now, a third (new) access occurs to cache line 7, as shown in the diagram 300B of FIG. 3B, and the box is grown to enclose the new point. As always with a new data point, the box grows along the x-axis. However, the upper edge of the box also grows (upward in this case) along the y-axis. This change in direction and reflection of pointers to the minimum and maximum access are reflected on the right hand side of the diagram 300B. It is the movement of the lower and upper edges of the box that is used to determine whether a pattern of accesses is trending upward, downward, or neither.

In addition to tracking the trends of the lower and upper edges of the bounding box to determine a direction trend, the individual accesses are tracked, since it is often the case that patterns of accesses skip one or more cache lines. Thus, in order to prevent wasting prefetches on cache lines that are likely to be skipped, once an upward or downward trend has been detected, a bounding box prefetcher (including the bounding box prefetch unit with PSC of the present disclosure) uses additional criteria to determine which cache lines to prefetch. Because of the tendency of accesses to be reordered, a bounding box prefetcher represents the history of accesses with the temporal ordering aspect stripped away. This is done by marking bits in an access bitmask, where each bit corresponds to one cache line within a memory block. For each access that arrives to a particular memory block, the corresponding bit in the access bitmask is set. Once a sufficient number of accesses have been made to the memory block, the prefetcher uses the access bitmask, which has no indication of the temporal ordering of the accesses, to make prefetching decisions (e.g., predictions)

based on the large view of accesses to the entire block rather than making prefetching decisions based on a very small view of accesses and strictly according to their occurrence in time as with conventional prefetchers.

Figure 4:
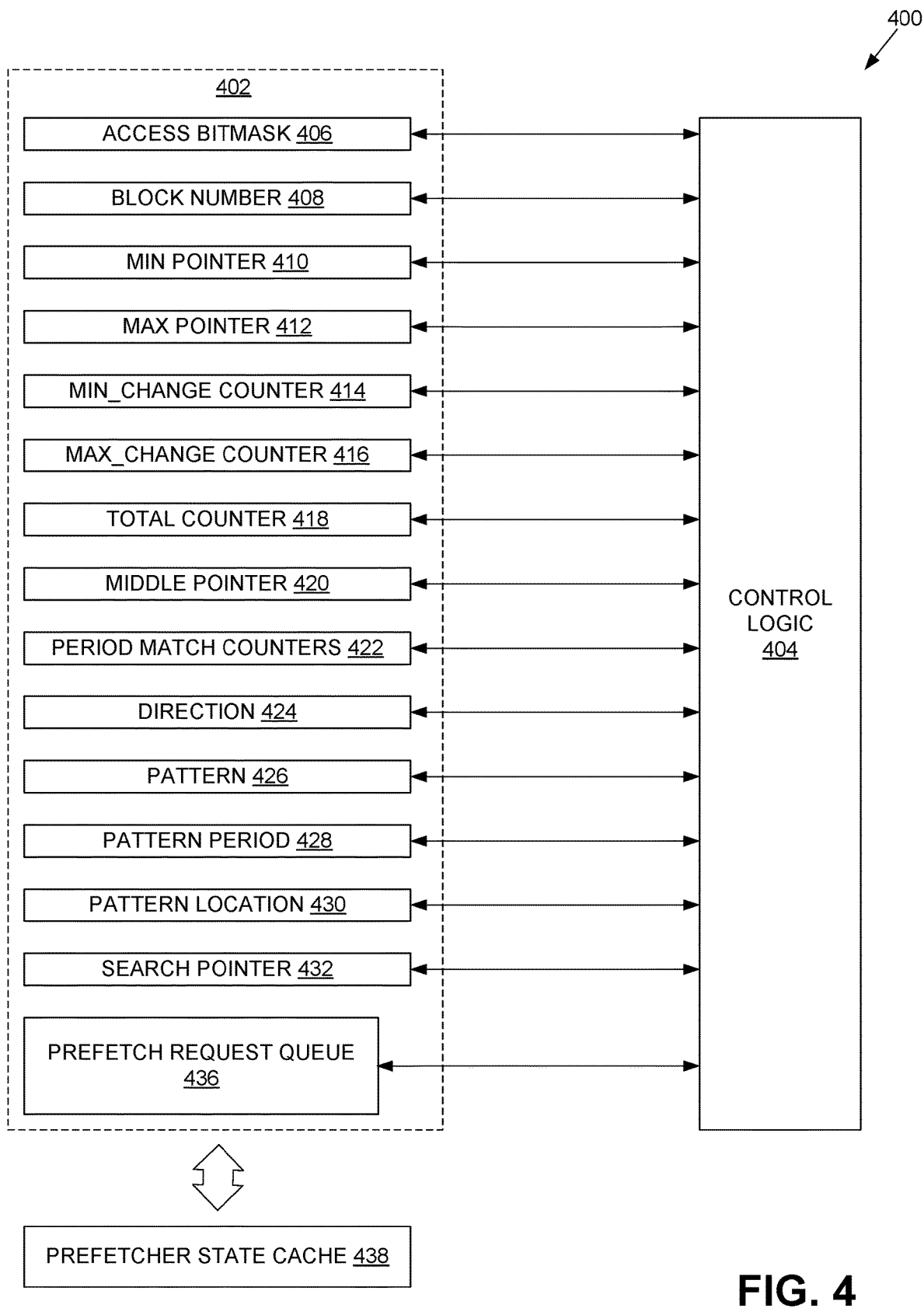
FIG. 4 is a block diagram that illustrates an embodiment of a prefetcher state entry and associated prediction logic for tracking state information for an access stream to enable prefetching, and a prefetcher state cache, in accordance with an embodiment of a bounding box prefetch unit with PSC.

With this general description of bounding box prefetchers, attention is now directed to FIG. 4, which is a block diagram that illustrates storage and control logic (e.g., prediction logic) for an embodiment of a bounding box prefetch unit with PSC. As indicated above, description of much of the hardware and control logic depicted in FIG. 4 is based at least in part on U.S. Pat. No. 8,880,807 (hereinafter, '807 patent), which is incorporated herein by reference in its entirety, where enhancements are further described to track additional access streams. Referring to FIG. 4, shown is the bounding box prefetch unit 400 comprising storage (e.g., a plurality of registers) 402 and control logic 404 (e.g., which may be embodied as a control unit, including a finite state machine) for each prefetcher state entry (among plural prefetcher state entries maintained by the bounding box prefetch unit with PSC). In other words, the bounding box prefetch unit 400 maintains plural prefetcher state entries to enable a tracking of accesses (via state information, or simply, state) to, and, in general, pattern matching for, multiple memory blocks or pages, with storage comprising a combination of active prefetcher state entries and corresponding prediction logic for each prefetcher page (e.g., 4 KB page) to implement prefetch generation. Note that the bounding box prefetch unit with PSC 232 (FIG. 2) may be implemented using the bounding box prefetch unit with PSC 400 shown and described in association with FIG. 4.

The storage 402 comprises an access bitmask register 406 (also referred to as a block bitmask register). Each bit in the access bitmask 406 corresponds to one cache line within a memory block whose block number is stored in a block number register 408. That is, the block number register 408 stores the upper address bits of the memory block. A true value of a bit in the access bitmask 406 indicates that the corresponding cache line has been accessed. The access bitmask 406 is initialized such that all bits are false. In one embodiment, the size of a memory block is 4 KB (which may in some instances equal the size of a physical memory page) and the size of a cache line is 64 bytes; thus, there are 64 bits in the access bitmask 406. However, the size of a cache line may vary in other embodiments. Furthermore, the size of the memory region over which the access bitmask 406 is maintained may vary and does not necessarily correspond to the size of a physical memory page. Rather, the size of the memory region, or block, over which the access bitmask 406 is maintained may be arbitrary (preferably a power of two), as long as it encompasses a sufficiently large number of cache lines to enable detection of a clear direction and pattern for beneficial prefetching purposes. In the description that follows, the memory block is described as corresponding to a page and has a corresponding prefetcher state entry.

The storage 402 also includes a minimum (min) pointer register 410 and a maximum (max) pointer register 412 that are maintained to point to the lowest and highest cache line index, respectively, within the memory block that has been accessed since the bounding box prefetch unit with PSC 400 began tracking accesses to this memory block. The storage 402 also includes a min_change counter 414 and a max_change counter 416 that count the number of changes to the min pointer 410 and the max pointer 412, respectively, since the bounding box prefetch unit with PSC 400 began tracking accesses to this memory block. The storage 402 also includes a total counter 418 that counts the total number of cache lines accessed since the bounding box prefetch unit with PSC 400 began tracking accesses to this memory block. In some embodiments, other mechanisms may be used to count the accesses, including using a population count of the access mask (e.g., a 64-bit pop count). The storage 402 also includes a middle pointer 420 that points to the middle cache line index (i.e., the average of the min pointer 410 and max pointer 412) within the memory block that has been accessed since the bounding box prefetch unit with PSC 400 began tracking accesses to this memory block. The storage 402 also includes a direction register 424, a pattern register 426, a pattern period register 428, a pattern location register 430, and a search pointer register 432, whose uses are described in more detail below.

The storage 402 also includes a plurality of period match counters 422. Each of the period match counters 422 maintains a count for a different period. In one embodiment, the periods are 3, 4, and 5, though other period values may be used in some embodiments. The period is the number of bits to the left/right of the middle pointer 420. The period match counters 422 are updated after each memory access to the block. If the access bitmask 406 indicates that the accesses to the left of the middle pointer 420 over the period match the accesses to the right of the middle pointer 420 over the period, then the bounding box prefetch unit with PSC 400 increments the period match counter 422 associated with that period. The operation and use of the period match counters 422 are described in more detail below.

Describing the aforementioned storage 402 in the context of prefetching, as explained above and illustrated in FIG. 2, the prefetch interface 230 is fed by incoming load requests from the L1D and the L1I. The L1 cache is sending load requests to the L2 cache 112 for accesses that missed in the L1 cache. For instance, upon the L1 cache receiving a load or store instruction, there is a search of the address in the L1D to which to load or store. More specifically, the L1D tag array 260 is searched to see if the cache line is present, whereby the request is satisfied directly, otherwise upon a cache miss, the request is forwarded to the L2 cache 112, which is bigger than the L1D and hence the request is more likely to hit there. However, the L2 cache 112 is also slower and further away from the execution units, resulting in a higher latency of access. If there is a miss in the L2 cache 112, then the request is forwarded to the L3 cache 130 (or forwarded to system memory if there is no L3 cache). The bounding box prefetch unit with PSC 232 (also 400) of the prefetch interface 230 monitors the stream of load requests (loads and stores), or access streams, coming in from the L1D (and the L1I) and attempts to predict patterns. In general, the load requests that come in from the L1D (and the L1I) are received into a prefetch input queue and are removed in a subsequent clock cycle. There is a physical address associated with the removed load, and the physical address is truncated to be directed to the 4 KB address memory region (e.g., the 4 KB page corresponding to this request), and compared to determine a match with any pages corresponding to a respective 4 KB region of memory that the bounding box prefetch unit with PSC is monitoring (e.g., to determine if there is storage and control logic allocated for this page). Assuming there is a match, the bounding box prefetch unit with PSC updates state information associated with the memory block, determines an offset into the memory region, and decodes it into a corresponding cache line (e.g., a 64-bit vector).

The access bitmask 406 corresponds in one embodiment to the page entry of the memory region, where a bit is set for each cache line accessed during the monitoring of the memory region. If the bit was not already set, then this is a new access, in which case the total counter 418 (corresponding to the number of cache lines within the page that have been accessed) is incremented. Other state information that is updated include the block number 408 for the corresponding 4 KB page address or memory region. The min pointer 410 or the max pointer 412 are updated for each access. That is, for each access, a determination is made as to whether this access is either below the current MIN or above the current MAX, and if so, the pointers are adjusted accordingly. Additionally, the counters min_change counter 414 and max_change counter 416 are incremented. The middle pointer 420 is adjusted, and the direction 424 (e.g., to determine whether the stream is going up or down) is adjusted based on the min_change counter 414 versus the max_change counter 416. For instance, a comparison is made between the number of times the min_change counter 414 versus the max_change counter 416 is changed.

Digressing briefly, since memory requests may occur out of order (e.g., reordered between a reservation station and memory order buffer, as is known), the state information facilitates determinations on the direction in the pattern of accesses. For instance, if the min_change counter 414 is updated twice and the max_change counter 416 is updated, say, ten times, there is a good chance the stream is trending upwards. Note that in some embodiments, other or additional mechanisms may be used to establish direction. For instance, a sub-sampling of page accesses (e.g., using first two accesses in the lower or upper quartile of a page, etc.) may be used to establish direction. The storage 402, including the period match counters 422, pattern 426, pattern period 428, pattern location 430, and search pointer 432, are used directly by the control logic 404 to determine a pattern in the accesses and then use those access patterns to make predictions of cache lines to prefetch.

The storage 402 also includes a prefetch request queue 436 (an output queue). The prefetch request queue 436 comprises a circular queue of entries, each of which stores prefetch requests generated by the operation of the bounding box prefetch unit with PSC 400. In one embodiment, the size of the prefetch request queue 436 is chosen to allow for full pipelining of requests into the L2 cache tag pipeline 250 (FIG. 2) such that the number of entries in the prefetch request queue 436 is at least as many as the number of stages in the L2 cache tag pipeline 250. The prefetch requests are maintained until the end of the L2 cache tag pipeline 250, at which point requests have one of three outcomes, namely: a hit in the L2 cache 112, a replay, or an allocation of a fill queue entry to prefetch the desired data from system memory. Note that the bounding box prefetch unit with PSC 400 also includes an input prefetch request queue (not shown) that receives requests from the L1D that are going into the L2 cache.

The bounding box prefetch unit with PSC 400 also includes control logic 404 that controls the elements of the bounding box prefetch unit 400 to perform the various functions described herein. The control logic 404, in effect, comprises prediction logic for prefetching based on the state information in storage 402.

The bounding box prefetch unit with PSC 400 also includes the prefetcher state cache (PSC) 438, which is described further below in association with FIG. 6. In general, the prefetcher state cache 438 has less types of state information than maintained in the storage 402, yet more prefetcher state entries. Further, the prefetcher state cache 438 has no associated prediction logic, allowing for a decoupling of growth of storage capacity, for tracking access streams, from what would conventionally be an increased quantity or complexity of prediction logic.

Figure 5:
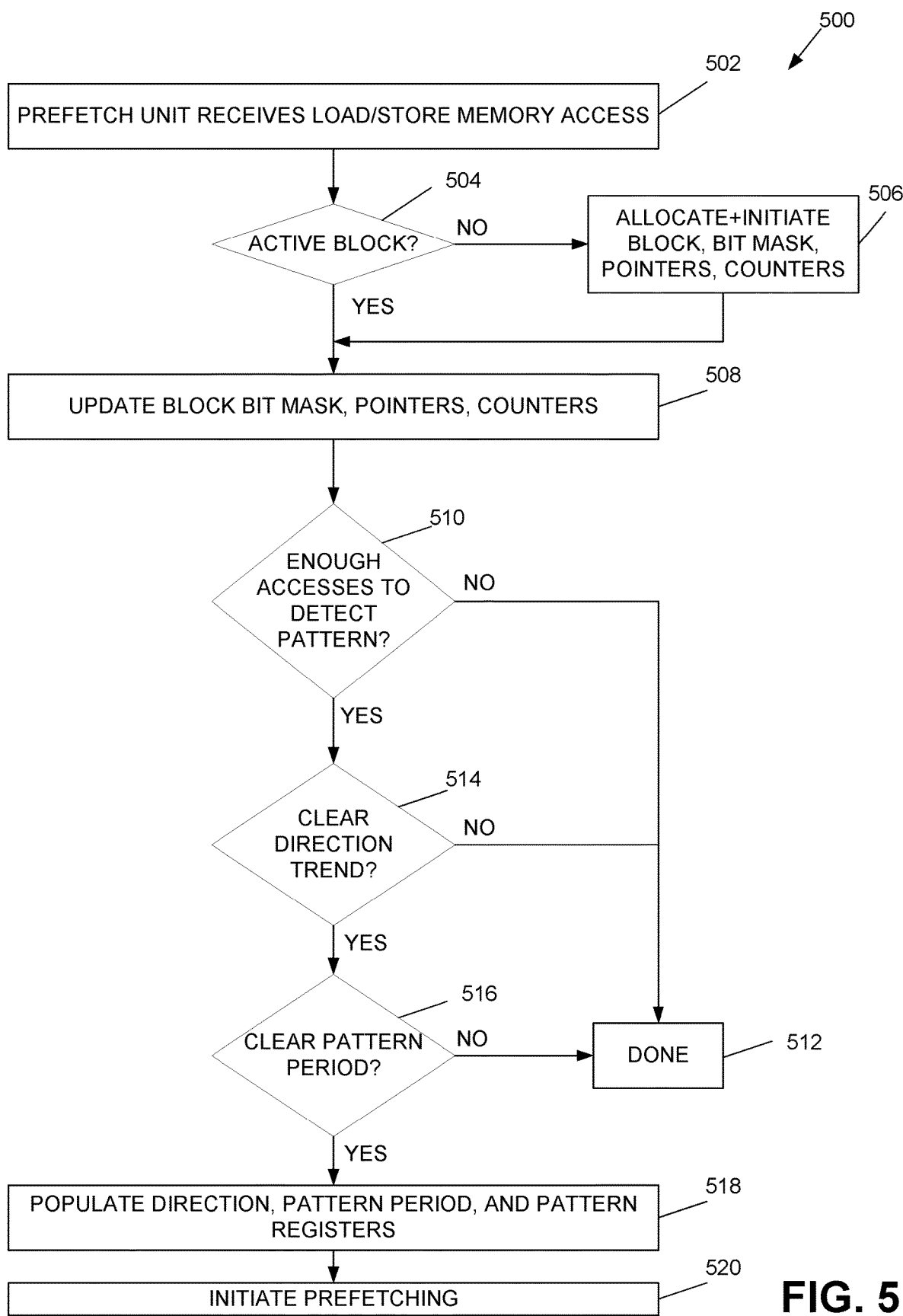
FIG. 5 is a flow diagram that illustrates a general method of operation of a bounding box prefetch unit with PSC.

FIG. 5 is a flow diagram that illustrates a general method of operation 500 of an embodiment of a bounding box prefetch unit with PSC, such as bounding box prefetch unit with PSC 400 (and 232). The general method 500 relates to the prediction of prefetches of cache lines based on pattern matching using the state information maintained for each active prefetcher state entry in the respective storage 402 for each active memory block. At block 502, the bounding box prefetch unit with PSC receives a load/store memory access to a memory address. In one embodiment, the bounding box prefetch unit with PSC distinguishes between loads and stores in determining which cache lines to prefetch; in another embodiment, the bounding box prefetch unit with PSC does not distinguish between loads and stores in determining which cache lines to prefetch. In one embodiment, the bounding box prefetch unit with PSC receives the memory access from a load/store unit in the microprocessor. The bounding box prefetch unit with PSC may receive the memory access from various sources including, but not limited to, the load/store unit, the L1 data cache 114 (e.g., an allocation request generated by the L1 data cache 114 as a result of a load/store unit memory access that misses in the L1 data cache 114), and/or other sources such as other prefetch units (not shown) of the microprocessor that employ different prefetch algorithms than the bounding box prefetch unit with PSC to prefetch data.

At decision block 504, the control logic 404 determines whether the memory access is to an active block by comparing the memory access address with each block number register 408 value. In other words, the control logic 404 determines whether a prefetcher state entry (and control logic) has been allocated for the memory block implicated by the memory address specified by the memory access. If so, flow proceeds to block 508; otherwise, flow proceeds to block 506.

At block 506, assuming for now that not all prefetcher state entries have been used (see, e.g., FIG. 7, block 708), the control logic 404 allocates a prefetcher state entry for the implicated memory block. For instance, the bounding box prefetch unit with PSC receives a memory access, and if there is no active entry for the corresponding page yet capacity for an additional entry, a new prefetcher state entry (including initiating the corresponding storage and control logic) is initiated for the new page. Note that the prefetcher state entries are fully independent of one another, since each prefetcher state entry corresponds to a unique 4 KB region of memory. In one embodiment, allocation is achieved in a round-robin fashion. In another embodiment, least-recently-used information for the storage and control logic is maintained and allocation is performed on a least-recently-used basis. In particular, the control logic 404 initiates by clearing all the bits of the access bitmask 406, populating the block number register 408 with the upper bits of the memory access address, and clearing to zero the min pointer 410, max pointer 412, min_change counter 414, max_change counter 416, total counter 418, and period match counters 422. Flow proceeds to block 508.

At block 508, the control logic 404 updates the storage 402 based on the memory access address. For instance, the control logic 404 increments the total counter 418, and makes a determination whether the current memory access address is greater than the max pointer 412 or less than the min pointer 410. More specifically, for the max pointer 412 determination, the control logic 404 determines whether the current memory access address—i.e., the index within the memory block of the cache line implicated by the current memory access address—is greater than the max pointer 412 value. If so, the control logic 404 updates the max pointer 412 with the index within the memory block of the cache line implicated by the current memory access address and increments the max_change counter 416 and then proceeds to a middle pointer 420 determination. If not, the determination proceeds for the min pointer 410 comparison. That is, the control logic 404 determines whether the index within the memory block of the cache line implicated by the current memory access address is less than the min pointer 410 value. If so, the control logic 404 updates the min pointer 410 with the index within the memory block of the cache line implicated by the current memory access address and increments the min_change counter 414. Following the updates, the control logic 404 computes the average of the min pointer 410 and max pointer 412 and updates the middle pointer 420 with the computed average. The control logic 404 then examines the access bitmask 406 and isolates the N bits to the left and right of the middle pointer 420, where N is the number of bits associated with each of the respective period match counters 422. The control logic 404 then determines whether the N bits to the left of the middle pointer 420 match the N bits to the right of the middle pointer 420. If so, the control logic 404 increments the associated period match counter 422 having a period N, otherwise the update ends.

At decision block 510, the control logic 404 examines the total counter 418 to determine whether the program has made enough accesses to the memory block to detect a pattern of accesses. In one embodiment, the control logic 404 determines whether the total counter 418 value is greater than a predetermined amount, which in one embodiment is ten, although the predetermined amount may vary. If enough accesses have been made, flow proceeds to decision block 514; otherwise, flow ends 512.

At decision block 514, the control logic 404 determines whether there is a clear direction trend among the accesses specified in the access bitmask 406. That is, the control logic 404 determines whether the accesses are clearly trending upward (increasing access addresses) or downward (decreasing access addresses). In one embodiment, the control logic 404 determines whether there is a clear direction trend by determining whether the difference between the min_change counter 414 and the max_change counter 416 is greater than a predetermined amount, which in one embodiment is two, although the predetermined amount may vary. If the min_change counter 414 is greater than the max_change counter 416 by the predetermined amount, then the clear trend is downward; whereas, if the max_change counter 416 is greater than the min_change counter 414 by the predetermined amount, then the clear trend is upward. If there is a clear direction trend, flow proceeds to decision block 516; otherwise, flow ends 512.

At block 516, the control logic 404 determines whether there is a clear pattern period winner among the accesses specified in the block bitmask 406. In one embodiment, the control logic 404 determines whether there is a clear pattern period winner by determining whether the difference between one of the period match counters 422 and all the other period match counters 422 is greater than a predetermined amount, which in one embodiment is two, although the predetermined amount may vary. If there is a clear pattern period winner, flow proceeds to block 518; otherwise, flow ends 512.

At block 518, the control logic 404 populates the direction register 424 to indicate the clear direction trend determined at decision block 514. Additionally, the control logic 404 populates the pattern period register 428 with the clear winning pattern period (N) detected at decision block 516. Finally, the control logic 404 populates the pattern register 426 with the clearly winning pattern detected at decision block 516. That is, the control logic 404 populates the pattern register 426 with the N bits of the access bitmask 406 to the right or left of the middle pointer 420 (which will match, according to the description above for the updating in block 508). Flow proceeds to block 520.

At block 520, the control logic 404 initiates prefetching of non-fetched cache lines within the memory block. As an illustration of one method for the prefetching of non-fetched cache lines, the control logic 404 initializes the search pointer 432 and pattern location 430 at one pattern period 428 away from the middle pointer 420 in the detected direction. That is, the control logic 404 initializes the search pointer 432 and pattern location 430 to the sum/difference of the middle pointer 420 value and the period (N) value of the detected pattern. For example, if the middle pointer 420 value is 16 and N is five and the direction 424 is upward, then the control logic 404 initializes the search pointer 432 and pattern location 430 to 21. Thus, in this example, the five bits of the pattern 426 would be located against bits 21 through 25 of the access bitmask 406 for comparison purposes. The control logic 404 examines the bit in the access bitmask 406 at the search pointer 432 and the corresponding bit in the pattern 426 (which is located against the access bitmask 406 at the pattern location 430) to determine whether to prefetch the corresponding cache line within the memory block. The control logic 404 predicts whether the examined cache line is needed. The control logic 404 predicts the cache line is needed if the bit in the pattern 426 is true (i.e., the pattern predicts the program will access the cache line). If the cache line is needed, flow proceeds to determine whether the cache line is already fetched. Otherwise, the control logic 404 determines whether there are any more unexamined cache lines in the memory block by determining whether the search pointer 432 has reached an end of the access bitmask 406, and if there are no more cache lines, flow ends, otherwise, flow proceeds with the control logic 404 incrementing/decrementing the search pointer 432. Additionally, if the search pointer 432 has passed beyond the last bit of the pattern 426, the control logic 404 updates the pattern location 430 with the new value of the search pointer 432 (i.e., shifts the pattern 426 to the new search pointer 432 location), and then flow returns to examining the bit in the access bitmask 406 as described above.

Continuing, the control logic 404 determines whether the needed cache line has already been fetched. The control logic 404 determines that the needed cache line has already been fetched if the bit in the access bitmask 406 is true. If the needed cache line has already been fetched, flow proceeds to determining whether there are any more unexamined cache lines in the memory block as described above, otherwise the control logic 404 determines whether the cache line under consideration is more than a predetermined amount (which is sixteen in one embodiment) from the min pointer 410 if the direction 424 is downward or from the max pointer 412 if the direction 424 is upward. If so, flow ends; otherwise, flow proceeds to determining whether the request queue is full. It is noted that if the cache line is too far away from the min pointer 410/max pointer 412 such that flow ends, this does not mean that the bounding box prefetch unit with PSC will not subsequently prefetch additional cache lines within the block, since a subsequent access to a cache line within the block may trigger more prefetching within the block. Continuing, the control logic 404 determines whether the prefetch request queue 436 is full. If so, the control logic 404 stalls until the prefetch request queue 436 becomes non-full flow and then proceeds to allocate an entry as described below. Otherwise, the control logic 404 allocates an entry into the prefetch request queue 436 to prefetch the cache line.

Note that variations to the above methods of operation may be implemented, as described in part in the '807 patent, and hence are contemplated to be within the scope of the disclosure.

In one embodiment, one or more of the predetermined amounts described herein are programmable, either by the operating system (such as via a model specific register (MSR)) or via fuses of the microprocessor 100 that may be blown when the microprocessor 100 is manufactured.

Figure 6:
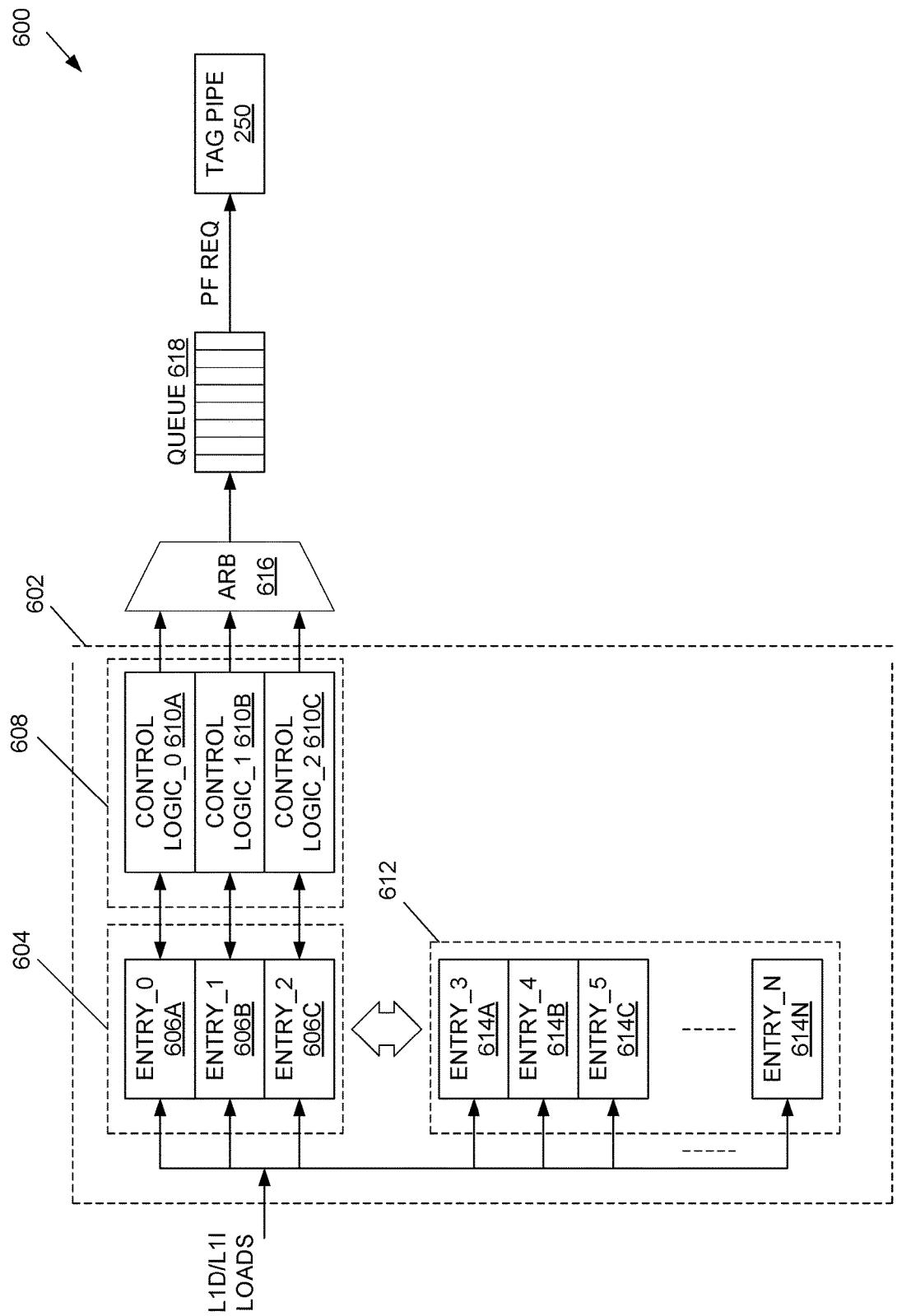
FIG. 6 is a schematic diagram that further illustrates the bounding box prefetch unit comprising plural active prefetcher state entries and corresponding prediction logic, and the PSC comprising plural prefetcher state entries without corresponding prediction logic, in accordance with an embodiment of a bounding box prefetch unit with PSC.

Having described a general operation of the bounding box prefetch unit with prefetcher state cache 400 (FIG. 4), attention is now directed to FIG. 6, which is a schematic diagram that further illustrates a system 600 comprising a bounding box prefetch unit with PSC 602, and select portions of the L2 cache 112 (FIG. 2), including an arbitrator 616, queue 618, and the tag pipe 250. The bounding box prefetch unit with PSC 602 has the same or similar features as the bounding box prefetch unit with PSC 400 (FIG. 4). In one embodiment, the bounding box prefetch unit with PSC 602 comprises storage 604, which comprises a plurality of active prefetcher state entries 606 (e.g., 606A, 606B, and 606C in this illustrative, non-limiting example), and control (e.g., prediction) logic 608, including control logic_0 610A for active prefetcher state entry 606A, control logic_1 610B for active prefetcher state entry 606B, and control logic_2 610C for active prefetcher state entry 606C. The bounding box prefetch unit with PSC 602 further comprises the PSC or prefetcher state cache 612, which includes prefetcher state entries 614 (e.g., entry_3 614A, entry_4 614B, etc.) without the need for additional prediction logic, hence increasing the capacity of the bounding box prefetch unit with PSC 602 to track more access streams while decoupling the prediction logic in achieving this increased tracking capacity (i.e., without adding associated prediction logic). The prefetcher state entries 614 are allocated in the prefetcher state cache 612 for loads that do not match (e.g., the address region for) any of the active prefetcher state entries 606, and when all of the active prefetcher state entries 606 are utilized.

Each of the active prefetcher state entries 606 stores state information for a corresponding access stream to a page associated with a distinct memory region (e.g., 4 KB page as an illustrative example), as explained in association with FIG. 4. On the other hand, each of the plurality of prefetcher state entries 614 of the prefetcher state cache 612 comprises a subset of the state information shown and described in association with the storage 402 in FIG. 4 (or similarly, storage 604 in FIG. 6). In one embodiment, the state information of each of the plurality of prefetcher state entries 614 comprises first state information including a full physical address of a respective memory region (e.g., block number) and a map of accesses to cache line offsets within a page corresponding to a respective memory region (e.g., access bit mask). In some embodiments, the state information of each of the plurality of prefetcher state entries 614 further comprises second state information including a direction trend (e.g., if any) and an established confidence (e.g., if any). In some embodiments, other and/or additional state information may be stored as state information in each of the prefetcher state entries 614, or generally, the prefetcher state cache 612. Also, there are more prefetcher state entries in the prefetcher state cache 612 than there are prefetcher state entries in storage 604. Though storage 604 is depicted in FIG. 6 as having three prefetcher state entries compared to N prefetcher state entries in the prefetcher state cache 612, where N may be any quantity feasible based on design and cost constraints (and typically much greater than the quantity of active prefetcher state entries), it should be appreciated that other quantities may be used for all entries depicted in FIG. 6.

In general, the bounding box prefetch unit with PSC 602 uses the state information of the storage 604 and the control logic 608 to perform pattern matching (e.g., for a 4 KB page of physical memory) and prefetch generation. The prefetch requests are arbitrated at arbitrator 616, queued 618, and presented to the tag pipe 250 as explained above in association with FIG. 2.

Figure 7:
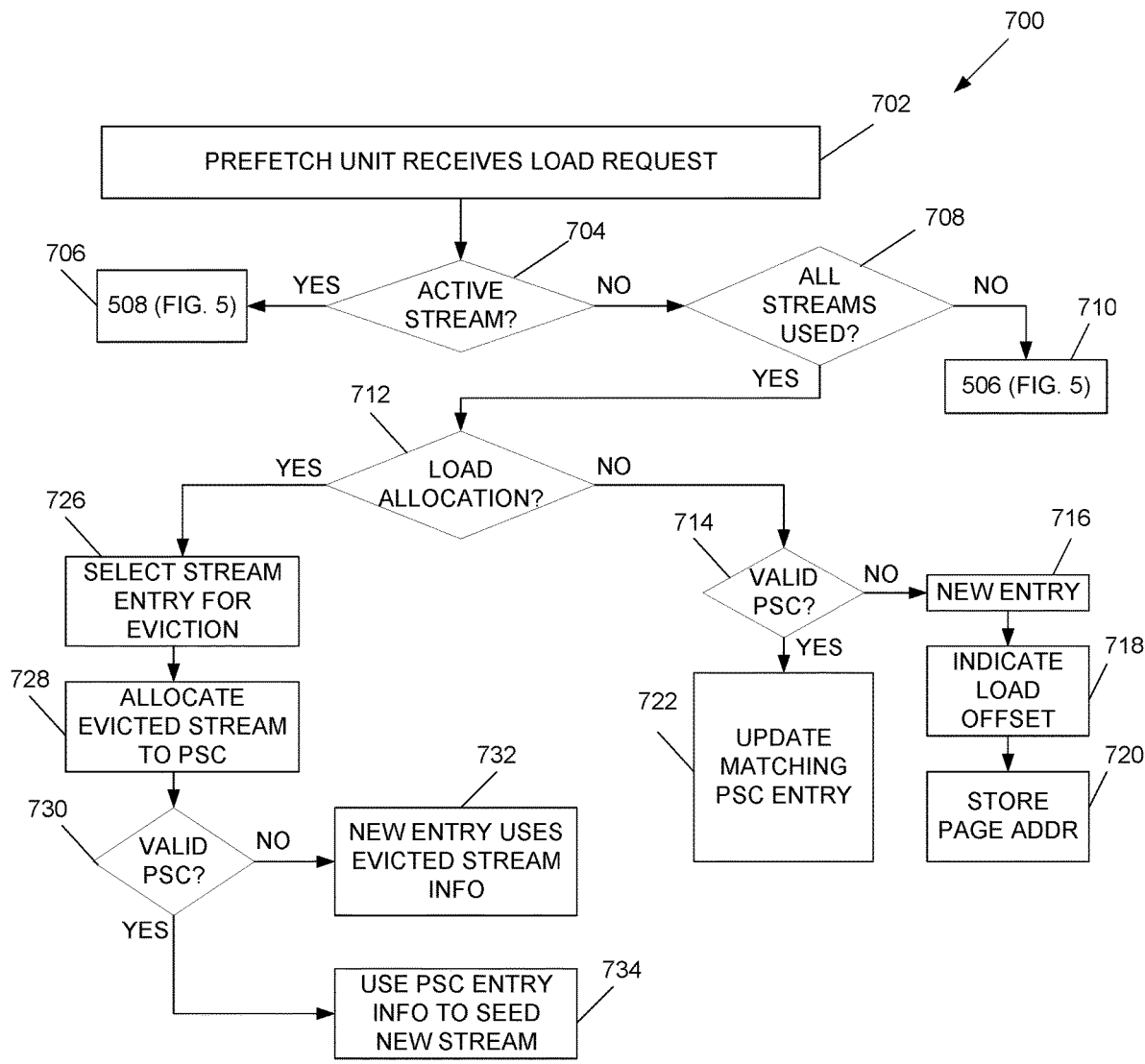
FIG. 7 is a flow diagram that illustrates an embodiment of an example method for managing prefetcher state entries for plural access streams associated with load requests for an embodiment of a bounding box prefetch unit with PSC.
Figure 8:
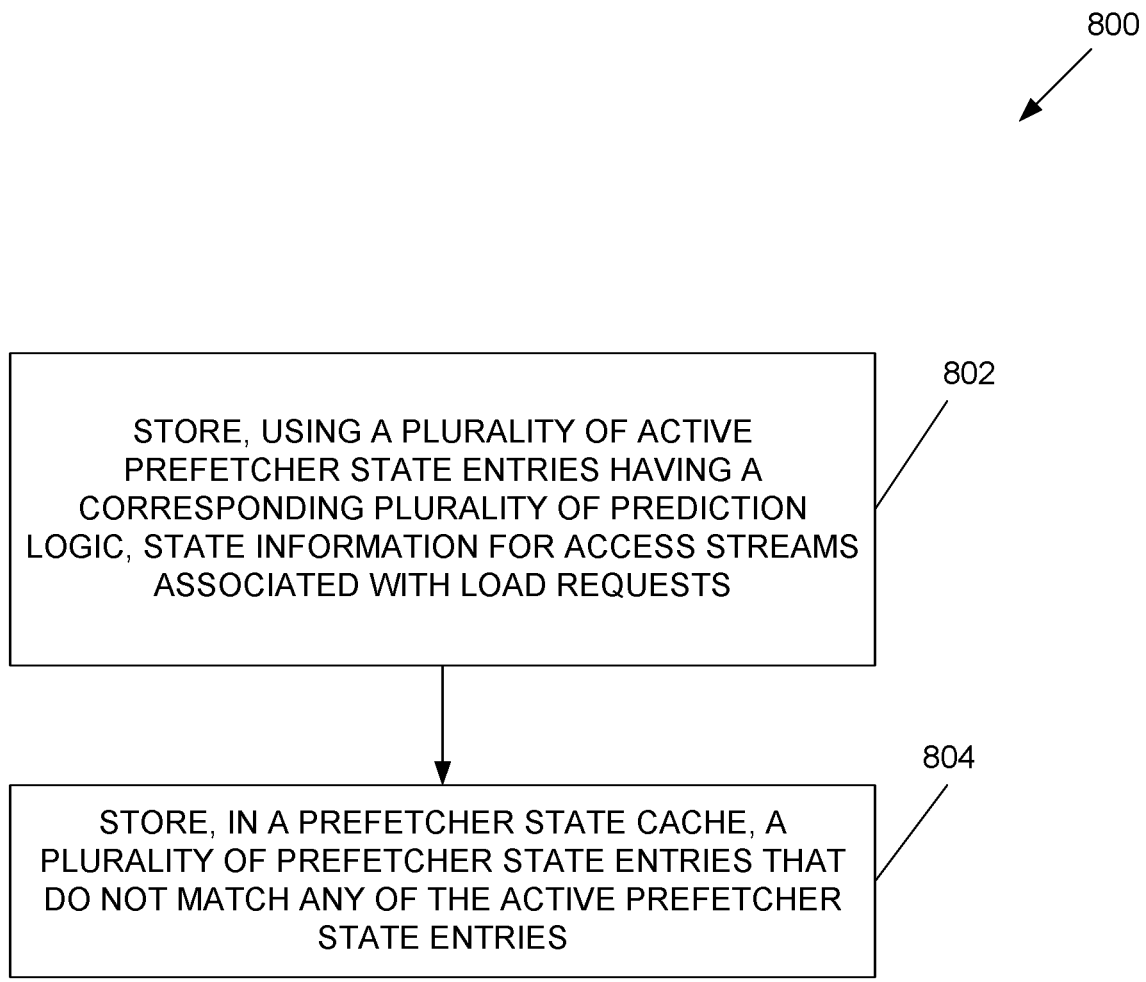
FIG. 8 is a flow diagram that illustrates an embodiment of another example method for managing prefetcher state entries for an embodiment of a bounding box prefetch unit with PSC.

The prefetcher state cache 612 decouples the storage from the prediction logic, and tracks select state information that is needed for prefetches. The state information may include the first and optionally second state information, as described above, including the physical address for the 4 KB page, number of accesses, direction, and in some embodiments, state information such as min and max pointer, access pattern, yet with no prediction logic associated with the prefetcher state entries 614. The prefetcher state cache 612 may be used to retain state information for an entry that has been evicted from the storage 604. The prefetcher state cache 612 is updated in a few ways, as described in association with method 700 of FIG. 7, and may be generally categorized as either a new load request not allocating into storage 604 or allocating into storage 604. The method 700 is performed by a microprocessor in general, and more specifically, may be performed by the bounding box prefetch unit 602 (or 400 or 232), and may be used in conjunction with the methods described in association with FIG. 5. Referring to FIG. 7, the method 700 receives a load request at block 702. At block 704, the method 700 determines whether the load request corresponds to an active prefetcher state entry 606. If so ("Yes"), then flow proceeds to block 706 according to the method at block 508 (FIG. 5) as described above, otherwise ("No") flow proceeds to block 708. At block 708, the method 700 determines whether all active prefetcher state entries 606 of storage 604 are utilized. If so ("Yes"), flow proceeds to block 710 according to the method at block 506 (FIG. 5), otherwise ("Yes") flow proceeds to block 712. At block 712, the method 700 determines whether the load allocates into the active prefetcher state entries 606 of storage 604 or not.

If not ("No"), the method 700 further determines at block 714 whether the load matches any valid PSC prefetcher state entries 614. If the load does not match any valid PSC prefetcher state entries 614, flow proceeds to block 716, where the method 700 creates a new prefetcher state entry in the PSC 612 and flow proceeds to blocks 718 and 720. At block 718, one bit is set to indicate the load offset (e.g., in an access bitmask), and at block 720, the new prefetcher state cache entry 614 stores the 4 KB page address (e.g., block number) of the load (720).

If the load does match a valid prefetcher state cache entry 614 ("Yes" to block 714), the method 700 updates the matching PSC prefetcher state cache entry 614 at block 722. For instance, the load prompts a setting of the access map bit (e.g., in an access bitmask) in the matching PSC prefetcher state entry 614, indicating a new access, and any other data (state information, including confidence) associated with the new prefetcher state cache entry is initialized.

Referring again to the method 700 at block 712, the load is determined to allocate ("Yes") into an active prefetcher state entry 606, where flow proceeds to blocks 726 through 734. Digressing briefly, the decision at block 712 may involve implementation of a stale counter (e.g., a least recently used (LRU) counter or algorithm). For instance, each entry may have a stale counter that is initialized to zero. Incoming loads that do not match trigger the stale counter to increment up to a predefined threshold, and if the threshold is reached (or exceeded), that event is an indication that the entry is to be evicted and replaced with a new entry. A load allocation into an active prefetcher state entry 606 of the storage 604 necessitates eviction of an active prefetcher state entry 606, and hence the method 700 selects an entry for eviction at block 726 (e.g., based on a stale counter as described above). At block 728, the evicted entry 606 allocates into the PSC 612. At block 730, the processing involved in the allocation depends on whether the incoming load request that prompted the eviction hits a valid prefetcher state entry 614. If there is no matching valid prefetcher state entry 614 ("No" at block 730), the new PSC entry 614 is populated with state information of the evicted prefetcher state entry (e.g., page address, access map, etc.) at block 732. If the load allocating into the active prefetcher state entry 606 hits a valid prefetcher state entry 614 of the PSC 612 ("Yes" at block 730), state information from the matching prefetcher state entry 614 is used to seed the new prefetcher state entry 606 at block 734. For instance, state information may include the PSC entry access map and other associated state information. By saving the state in the PSC 612, state information may be retained for many more access streams than in conventional bounding box prefetchers without the additional cost and complexity of additional prediction logic (e.g., for the search algorithm, request state, etc.).

Note that in some embodiments, the method 700 may be implemented as software managed or microcode managed. For instance, when an operating system is running multiple apps, it may not always schedule an application once it is preempted back onto the same processor core, so a web browser for instance, may be running on core0 and exhibiting good prefetching, and then preempted and rescheduled on core1. Core 1 has its own prefetchers and own L2 cache, thus not having any of the prior state information built up on core0. Whatever is scheduled on core0 is going to have bad data in the prefetcher until it builds up state (and likewise for core 1). In some embodiments, the prefetcher state cache may include a microcode interface or a software interface, enabling the state information associated with an application when it is preempted to be read out and saved for when it is scheduled—even when it is scheduled on a different core. Accordingly, an application or operating system is enabled by the interface to reload all of the prefetcher state information that was built up the last time the application was scheduled.

In view of the above description, it should be appreciated by one having ordinary skill in the art that one embodiment of an example method for managing prefetcher state entries for an embodiment of a bounding box prefetch unit with prefetcher state cache, denoted as method 800, comprises storing, using a plurality of active prefetcher state entries having a corresponding plurality of prediction logic, state information for access streams associated with load requests (802); and storing, in a prefetcher state cache, a plurality of prefetcher state entries that do not match any of the active prefetcher state entries (804).

Any process descriptions or blocks in flow diagrams should be understood as representing modules, segments, logic, or portions of code which include one or more executable instructions for implementing specific logical functions or steps in the process, and alternate implementations are included within the scope of the embodiments in which functions may be executed out of order from that shown or discussed, including substantially concurrently or in different order, or one or more of the blocks may be omitted, depending on the functionality involved, as would be understood by those reasonably skilled in the art of the present disclosure.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

Note that various combinations of the disclosed embodiments may be used, and hence reference to an embodiment or one embodiment is not meant to exclude features from that embodiment from use with features from other embodiments. In the claims, the word "comprising" does not exclude other elements or steps, and the indefinite article "a" or "an" does not exclude a plurality.

At least the following is claimed:

1. A bounding box prefetch unit in a microprocessor, the bounding box prefetch unit comprising:
   storage comprising a plurality of active prefetcher state entries for storing state information for a corresponding plurality of access streams associated with load requests, and a corresponding plurality of prediction logic; and
   a prefetcher state cache comprising plural prefetcher state entries that do not match any of the active prefetcher state entries.

2. The bounding box prefetch unit of claim 1, wherein the prefetcher state cache is configured to store the plural prefetcher state entries when all of the active prefetcher state entries are used.

3. The bounding box prefetch unit of claim 1, wherein each of the active prefetcher state entries comprises the state information for the corresponding access stream corresponding to a distinct memory region.

4. The bounding box prefetch unit of claim 1, wherein each of the plural prefetcher state entries of the prefetcher state cache consists a subset of the state information used in each of the plurality of active prefetcher state entries.

5. The bounding box prefetch unit of claim 4, wherein each of the plural prefetcher state entries of the prefetcher state cache comprises first state information including a full physical address of a respective memory region and a map of accesses to cache line offsets within a page corresponding to a respective memory region.

6. The bounding box prefetch unit of claim 5, wherein each of the plural prefetcher state entries of the prefetcher state cache further comprises second state information including a direction and a confidence.

7. The bounding box prefetch unit of claim 1, wherein based on a load request not allocating into the storage and based on not matching valid prefetcher state entry of the prefetcher state cache, the load request prompts creation of a new entry in the prefetcher state cache, an access map bit setting in the new entry to indicate a load offset, and storage of a page address of the load request.

8. The bounding box prefetch unit of claim 1, wherein based on a load request not allocating into the storage and based on matching a valid prefetcher state entry of the prefetcher state cache, the load request prompts an update of the matching valid prefetcher state entry.

9. The bounding box prefetch unit of claim 1, wherein based on a load request allocating into the storage:
one of the active prefetcher state entries is selected for eviction; and
the evicted prefetcher state entry allocates into the prefetcher state cache as a new entry, where the new entry uses the state information of the evicted prefetcher state entry, including page address and access map.

10. The bounding box prefetch unit of claim 1, wherein based on a load request allocating into the storage:
one of the active prefetcher state entries is selected for eviction; and
based on a hit to a valid prefetcher state entry of the prefetcher state cache, state information of the valid prefetcher state entry is used to seed a new active prefetcher state entry in place of the evicted active prefetcher state entry.

11. The bounding box prefetch unit of claim 1, wherein the one of the active prefetcher state entries selected for eviction is selected based on a confidence or a least recently used algorithm.

12. The bounding box prefetch unit of claim 1, further comprising an interface to the prefetcher state cache, wherein the interface enables an application or operating system to migrate prefetcher state information from a pre-empted core to a newly scheduled core of the microprocessor.

13. A method implemented in a bounding box prefetch unit of microprocessor, the method comprising:
storing, using a plurality of active prefetcher state entries having a corresponding plurality of prediction logic, state information for access streams associated with load requests; and
storing, in a prefetcher state cache, a plurality of prefetcher state entries that do not match any of the active prefetcher state entries.

14. The method of claim 13, wherein storing the plurality of prefetcher state entries is further based on a condition that all of the active prefetcher state entries are used.

15. The method of claim 13, wherein storing the plurality of prefetcher state entries consists of storing a subset of the state information used in the storage.

16. The method of claim 15, wherein storing the plurality of prefetcher state entries comprises storing first state information including a full physical address of a respective memory region and a map of accesses to cache line offsets within a page corresponding to a respective memory region.

17. The method of claim 16, wherein storing the plurality of prefetcher state entries comprises storing second state information including a direction and a confidence.

18. The method of claim 13, wherein based on a load request not allocating into the storage:
when the load request does not match any valid prefetcher state entries of the prefetcher state cache, creating a new entry in the prefetcher state cache, setting an access map bit in the new entry to indicate a load offset, and storing a page address of the load request; and
when the load request does match a valid prefetcher state entry of the prefetcher state cache, updating the valid prefetcher state entry.

19. The method of claim 13, wherein based on a load request allocating into the storage, selecting for eviction one of the active prefetcher state entries, and either:
allocating the evicted prefetcher state entry into the prefetcher state cache as a new entry, where the new entry uses the state information of the evicted prefetcher state entry, including page address and access map; or
based on a hit to a valid prefetcher state entry of the prefetcher state cache, state information of the valid prefetcher state entry is used to seed a new active prefetcher state entry in place of the evicted active prefetcher state entry.

20. The method of claim 13, further comprising enabling, via an interface to the prefetcher state cache, a migration of prefetcher state information from a preempted core to a newly scheduled core of the microprocessor.

* * * * *